United States Patent [19]

Brand et al.

[11] Patent Number: 4,753,859
[45] Date of Patent: Jun. 28, 1988

[54] NONAQUEOUS CELL

[75] Inventors: Laura E. Brand, Tinton Falls; Ignacio Chi, Fair Lawn; Shelie M. Granstaff, Jr., Chatham; Brijesh Vyas, Warren, all of N.J.

[73] Assignee: American Telephone and Telegraph Company, AT&T Laboratories, Murray Hill, N.J.

[21] Appl. No.: 107,326

[22] Filed: Oct. 13, 1987

[51] Int. Cl.⁴ ............................................. H01M 6/14
[52] U.S. Cl. ................................... 429/197; 429/201; 429/218
[58] Field of Search ............... 429/197, 194, 201, 218, 429/196

[56] References Cited

U.S. PATENT DOCUMENTS

| | | | |
|---|---|---|---|
| 3,864,167 | 2/1975 | Broadhead et al. | 429/194 |
| 3,928,067 | 12/1975 | Broadhead et al. | 429/194 |
| 3,960,595 | 6/1976 | Lehmann et al. | 429/197 |
| 4,056,663 | 11/1977 | Schlaikjer | 429/197 |

Primary Examiner—Anthony Skapars
Attorney, Agent, or Firm—Walter G. Nilsen

[57] ABSTRACT

A nonaqueous, lithium cell is described which exhibits excellent safety characteristics when exposed to abusive testing, as well as high energy density, good charge and discharge rates, and long recycle life. Particularly unique is the composition of the electrolyte which contains such substances as ethylene carbonate, propylene carbonate and one or more polyethylene glycol dialkyl ethers.

17 Claims, 3 Drawing Sheets

NONAQUEOUS CELL

TECHNICAL FIELD

The invention is a nonaqueous, lithium, rechargeable cell. In particular, the invention pertains to the electrolyte composition in such cells.

BACKGROUND OF THE INVENTION

Lithium nonaqueous batteries have attracted considerable interest in recent years because of their potentially high voltage and high energy content per unit weight. A particularly challenging problem associated with rechargeable lithium nonaqueous batteries is improvement of their recycling characteristics. It would be desirable for many applications that both efficiency and extent of recyclability be improved. It is desirable to accomplish this while maintaining the high voltage and high energy content characteristic of primary lithium batteries.

One of the major problems in nonaqueous cell design is safety, particularly when the cell is exposed to drastic environmental conditions such as electrically shorting the cell, rapid overcharge or rapid discharge. The basic problem is the high reactivity of the cell components (e.g., lithium metal) together with cell design requirements necessary to produce a cell with good capacity, extensive cycle life and reasonable charge/discharge rates.

An important part of cell design for nonaqueous cells is the ingredients and composition of the electrolyte system. The electrolyte system is made up of organic solvent and current-carrying species. Stringent requirements are imposed on solvent and current-carrying species. For example, they must be chemically inert to electrode materials (e.g., lithium metal for the negative electrode, and niobium triselenide for the positive electrode material). It should also exhibit sufficient ionic conductivity so as to permit reasonable charge and discharge rates. Generally, this requires significant solubility of current-carrying species in the solvent. Also, the electrolyte should wet the separator to insure reasonable ionic conductivity through the separator.

Electrolyte systems for nonaqueous batteries have been discussed in a number of references including U.S. Pat. No. 3,928,067, issued to J. Broadhead et al. on Dec. 23, 1975, and U.S. Pat. No. 3,864,167, issued to J. Broadhead et al. on Feb. 4, 1975. The first patent ('067) discloses the use of various polyethylene glycol dialkyl ethers as additives in small amounts (1-5 weight percent) to electrolyte systems for nonaqueous batteries to wet the separator and obtain the high charge and discharge rates. The second patent ('167) describes nonaqueous cells with a number of different positive electrode materials including niobium triselenide.

Particularly desirable is a lithium, nonaqueous, rechargeable cell with high energy density and cycle capacity which is safe, especially when exposed to extreme conditions such as electrical shorting or high temperatures.

SUMMARY OF THE INVENTION

The invention is based on the discovery that substantial amounts of polyethylene glycol dialkyl ethers in the electrolyte of nonaqueous, lithium cell prevents explosion on abusive testing (e.g., shorting the cell) and substantially increases the safety of the cell, in addition to improving the cycling efficiency of the cell. The invention is a nonaqueous lithium cell with an electrolyte comprising solvent and current-carrying species. The solvent comprises propylene carbonate, ethylene carbonate and substantial amounts of one or more polyethylene glycol dialkyl ethers. Preferred polyethers are polyethylene glycol dimethyl ethers such as triglyme and tetraglyme. Such nonaqueous cells have a number of advantages over prior art cells including high safety (freedom from violent explosion on exposure to extreme conditions), high charge rates and discharge rates, long cycle life and high shelf life. Generally, at least 15 mole percent propylene carbonate, ethylene carbonate and polyether proves useful in preventing cell explosion during abusive testing. More preferred is at least 25 mole percent polyether (preferably triglyme or tetraglyme) in the propylene carbonate/ethylene carbonate mixture. Various current-carrying species are included in the composition of the electrolyte. Typically, these current-carrying species are lithium salts with or without tetra-alkylammonium salts soluble in the solvent. Typical lithium salts are lithium hexafluoroarsenate and lithium hexafluorophosphate. Multiple salt electrolytes such as tetra-alkylammonium salts plus lithium salts are useful to improve ionic conductivity, especially at low temperatures. The addition of diethylcarbonate may also be useful, particularly for low temperature operation. Such electrolyte systems wet separators used in nonaqueous cells and permit high solubility of current-carrying species so as to provide reasonable discharge (and charge) rates, improve cycle performance for the cells and eliminate explosions and reduce fire hazard during abusive testing.

DETAILED DESCRIPTION

Figure 1:
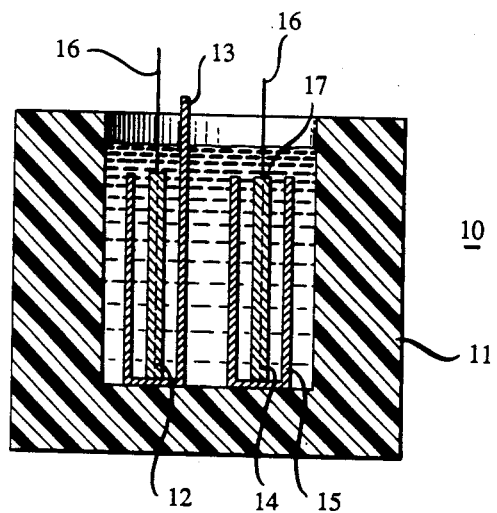
FIG. 1 shows a rectangular, nonaqueous cell featuring positive electrode, negative electrode and separator material.

An understanding of the invention is facilitated by a drawing of the structural formula of the substances discussed in the disclosure.

CH$_3$O[CH$_2$CH$_2$O]$_x$CH$_3$
Polyethylene glycol dialkyl ether (Glymes)
   diglyme x = 2
   triglyme x = 3
   tetraglyme x = 4

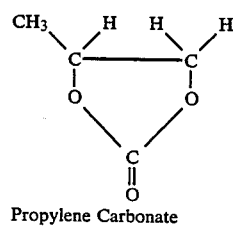

Propylene Carbonate

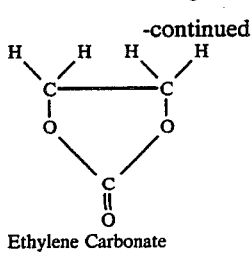

Ethylene Carbonate

The invention is based on the discovery that the inclusion of substantial amounts of certain polyethylene glycol dialkyl ethers such as polyethylene glycol dimethyl ethers (glymes) in the electrolyte system greatly improves safety for nonaqueous cells as well as improves the properties of nonaqueous cells including cell capacity and cycle performance. Also discovered was that the inclusion of certain aliphatic dialkylcarbonates (e.g., diethyl carbonate) in the electrolyte solvent system improves ionic conductivity and cell performance especially at low temperatures. In addition, the use of more than one salt, particularly mixtures of lithium salts and tetra-alkylammonium-type salts improves electrolyte conductivity and low temperature performance.

Particularly significant in the invention is the composition of the electrolyte system. It has been found that the inclusion of significant amounts of polyethers such as glymes in the electrolyte system dramatically reduces the safety hazards (e.g. explosion, fire, etc.) associated with sudden shorting and heating of non-aqueous, lithium cells. Amounts greater than 15 mole percent dramatically reduces safety hazards such as tendency to explode on shorting. Also, the presence of significant amounts of polyethylene glycol dialkyl ethers promotes wetting of the separators so as to permit rapid charging and discharging of the non-aqueous lithium cell.

Extensive tests are carried out to determine the optimum or preferred composition of the electrolyte. At least 15 mole percent of each of the major components is preferred, the major components being ethylene carbonate, propylene carbonate and polyethylene glycol dialkyl ethers. Various polyethylene glycol dialkyl ethers are useful. Various glymes (polyethylene glycol dimethyl ethers) are useful including diglyme, triglyme, tetraglyme, pentaglyme, hexaglyme and octaglyme. Various other polyethers are also of use including diethylene glycol diethyl ether, diethylene glycol dibutyl ether, diethylene glycol ethyl-t-butyl ether, diethylene glycol methyl-t-butyl ether, tetraethylene glycol diethyl ether and tetraethylene glycol dibutyl ether. Usually, it is advantageous if the electrolyte remain liquid so that preferred glycol ethers are those that insure that the electrolyte remain liquid.

Mixtures of these ethers are also useful. Most preferred is triglyme and tetraglyme and mixtures of these two ethers. More preferred is 20 to 50 mole percent polyether with 25–40 mole percent most preferred. The preferred amounts of ethylene carbonate are between 25 and 40 mole percent and the preferred amount of propylene carbonate is from 25 to 40 mole percent. An excellent electrolyte consists essentially of 30 mole percent of triglyme, tetraglyme or mixture of triglyme and tetraglyme, 35 mole percent propylene carbonate and 35 mole percent ethylene carbonate.

Optionally, other solvent ingredients may be included in the electrolyte system. In particular, various additional solvents may be added to decrease viscosity and increase ionic conductivity. Particularly useful are aliphatic dialkyl carbonates with the alkyl substituents having between two and six carbon atoms. Particularly useful is diethyl carbonate because of high stability under conditions of battery operation. Typical additions are from 0 to 30 mole percent, with 20 mole percent preferred.

The electrolyte includes, in addition to the solvent system described above, various current carrying species such as lithium salts, other soluble salts and tetraalkyl ammonium type salts. Typical lithium salts are $LiPF_6$, $LiAsF_6$, $LiClO_4$, $LiCF_3SO_3$, $LiBF_4$, $LiAlCl_4$, $LiI$ and $LiBr$ with $LiPF_6$ and $LiAsF_6$ preferred and $LiAsF_6$ most preferred. Other salts are also useful including tetraalkylammonium salts with the anion being either hexafluoroarsenate, hexafluorophosphate, tetra fluoroborate, perchlorate and halides such as chlorine, bromine and iodine and alkyl groups typically with up to six carbon atoms. Tetrabutylammonium salts and tetraethylammonium salt are preferred because of easy availability, high solubility and good conductivity exhibited with such electrolytes.

Particularly useful are electrolytes with more than one salt. Two or more lithium salts may be used (e.g., $LiPF_6$ and $LiAsF_6$). Preferred is the mixture of lithium salt (preferably $LiPF_6$ and/or $LiAsF_6$) and tetraalkylammonium salts (e.g., one or more of the tetrabutylammonium salts and tetraethylammonium salts). Such a mixture of salts yields exceptionally high charge and discharge rates especially at low temperatures.

Generally, the concentration of current-carrying species may vary over large limits, typically from 0.05 molar to saturation. Preferred concentrations are often determined by the concentration of maximum conductivity of the electrolyte solution, often around 0.25 to 0.75 of the saturation concentration. For example, for lithium salts, such as lithium hexafluoroarsenate and lithium hexafluorophosphate, typical concentrations are 0.4 to 1.5 molar with 0.6 to 1.0 molar preferred. For tetra-alkylammonium salts, concentrations between 0.1 and 1.0 molar are typical. For mixtures of lithium salts and tetra-alkylammonium salts, lithium salt concentrations of 0.4 to 0.8 molar and tetra-alkylammonium salt concentrations of 0.2 to 0.4 molar are preferred.

A variety of cell structures may be used in the practice of the invention. Generally, lithium is preferred as the active material in the negative electrode because of high electrode potential although sodium and potassium might be used. Also, a large variety of material can be used as the active material in the positive electrode including transition-metal chalcogenides. Particularly useful are a number of positive electrode materials such as $NbSe_2$, $NbSe_3$, $MoS_2$, $MoS_3$, $TiS_2$, $TiS_3$, $TaS_2$, $V_6O_{13}$ (stoichiometric and nonstoichiometric), $CoO_2$ and $MoO_2$. Generally, it is desirable to use positive electrodes with high cycle life, high energy density, etc. Particularly useful for these reasons are positive electrodes made from $NbSe_3$. This positive electrode, including procedures for preparation, is shown in U.S. Pat. No. 3,864,167, issued to J. Broadhead et al. on Feb. 4, 1975.

Various separator materials are also of use in the practice of the invention including various polymer materials, such as polyethylene and polypropylene generally made in the form of a microporous film. Preferred are various microporous polypropylene separators such as Celgard ® 2400 and Celgard ® 2402 made by the Celanese Corporation.

Various cell structures and sizes may be used in the practice of the invention. A typical rectangular structure is shown in FIG. 1. This figure shows a cross-section of a test cell structure 10 with plastic (polypropylene) holder 11, lithium negative electrode 12 with separator 13 and NbSe$_3$ positive electrode 14 with inert spacer material 15 to ensure a close fit in the cell holder 11. Metal wires 16 are used to conduct electrical energy out of the cell. The electrodes are covered with electrolyte 17 in accordance with the invention. Such structures are useful for commercial cells as well as for evaluating cell components, and electrolyte compositions.

Figure 2:
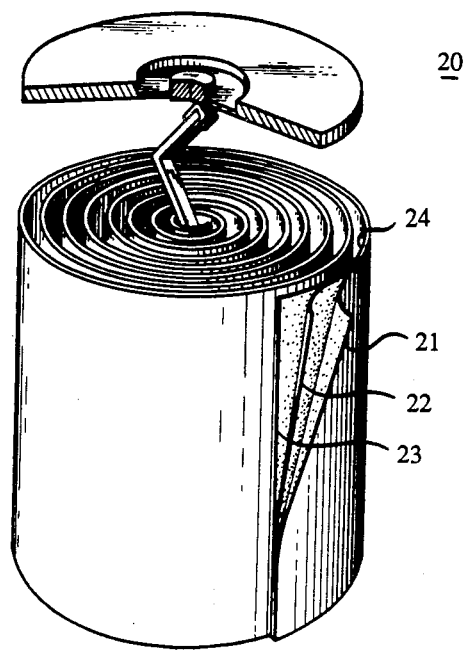
FIG. 2 shows a cylindrical, nonaqueous cell featuring positive electrode, negative electrode and separator material.

FIG. 2 shows another cell structure 20 useful in the practice of the invention. This cell structure is often called the rolled cylindrical cell structure. Four layers are put together and rolled into a cylindrical shape. The four layers are the negative lithium electrode 21, the separator 22, the positive electrode 23 (e.g., NbSe$_3$) and another separator layer 24. The roll is generally put into a cylindrical container with suitable electrical connections to positive and negative electrodes. The cylindrical container is filled with electrolyte to permit electrochemical action.

Figure 3:
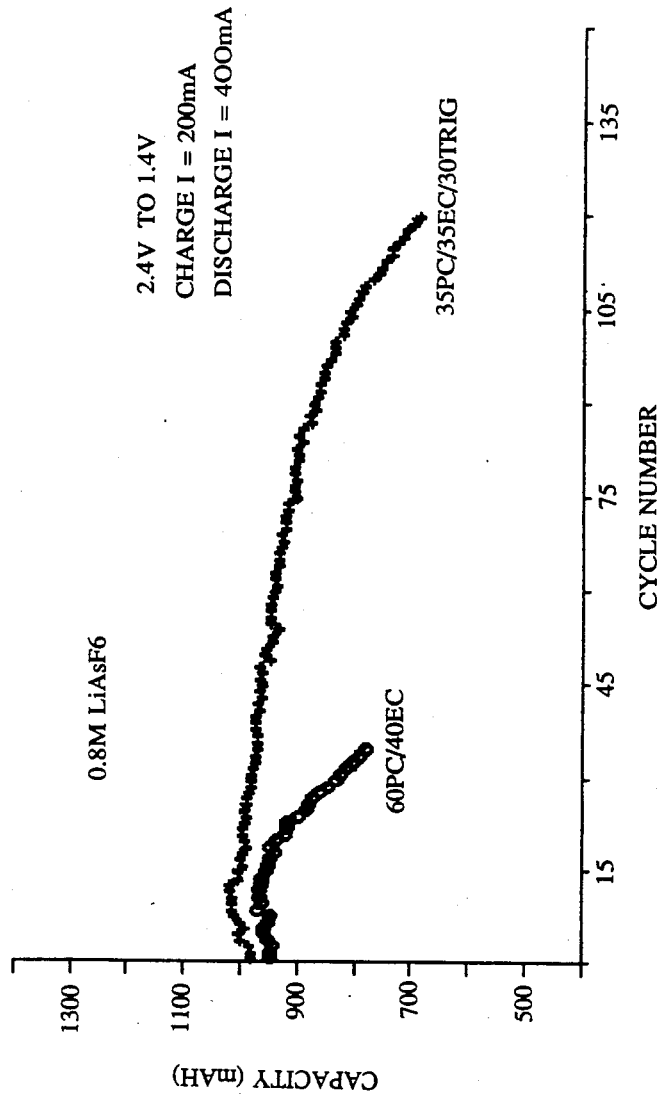
FIG. 3 shows data in graphical form on cycle life of a nonaqueous battery made in accordance with the invention.

Various tests were carried out to compare the cycle characteristics of lithium cells with only propylene carbonate and ethylene carbonate as solvents in the electrolyte and with a polyether (triglyme) in addition to propylene carbonate and ethylene carbonate as the solvent system. FIG. 3 shows the results of one such comparison test. This figure shows data on the cycle characteristics of cells with and without the polyether. Shown in FIG. 3 is a graph of the capacity characteristics of the cells as a function of cycle number for a cell with and without the polyether. The charging current was 200 mA and discharging current 400 mA. Cycles were carried out between 2.4 and 1.4 volts, and 0.8 molar LiAsF$_6$ was used as the electrolytic salt.

As can be seen by the graph, the addition of polyether to the propylene carbonate/ethylene carbonate mixture dramatically increases the cycle life of the cell. Indeed, it also increases the capacity of the cell over all of its cycle life and results in a cell of great commercial interest.

Data of safety are obtained in a variety of ways. It is generally well known that heating lithium metal in the presence of the electrolyte solvent will eventually lead to chemical reaction. The nature of this reaction with various solvents is particularly important with respect to cell safety.

Differential thermal analysis (DTA) provides an unusually accurate procedure for observing the reaction of organic solvents used in electrolytes with lithium. Experiments were carried out to study the thermally induced reaction of lithium with various mixed solvent electrolytes using differential scanning calorimetry (DSC). The solvents used are propylene carbonate (PC), ethylene carbonate (EC), 2 methyltetrahydroforan (MeTHF), diethylene carbonate (DEC), triethylene glycol dimethyl ether (triglyme or trig), and tetraethylene glycol dimethyl ether (tetraglyme or tetrag).

Figure 4:
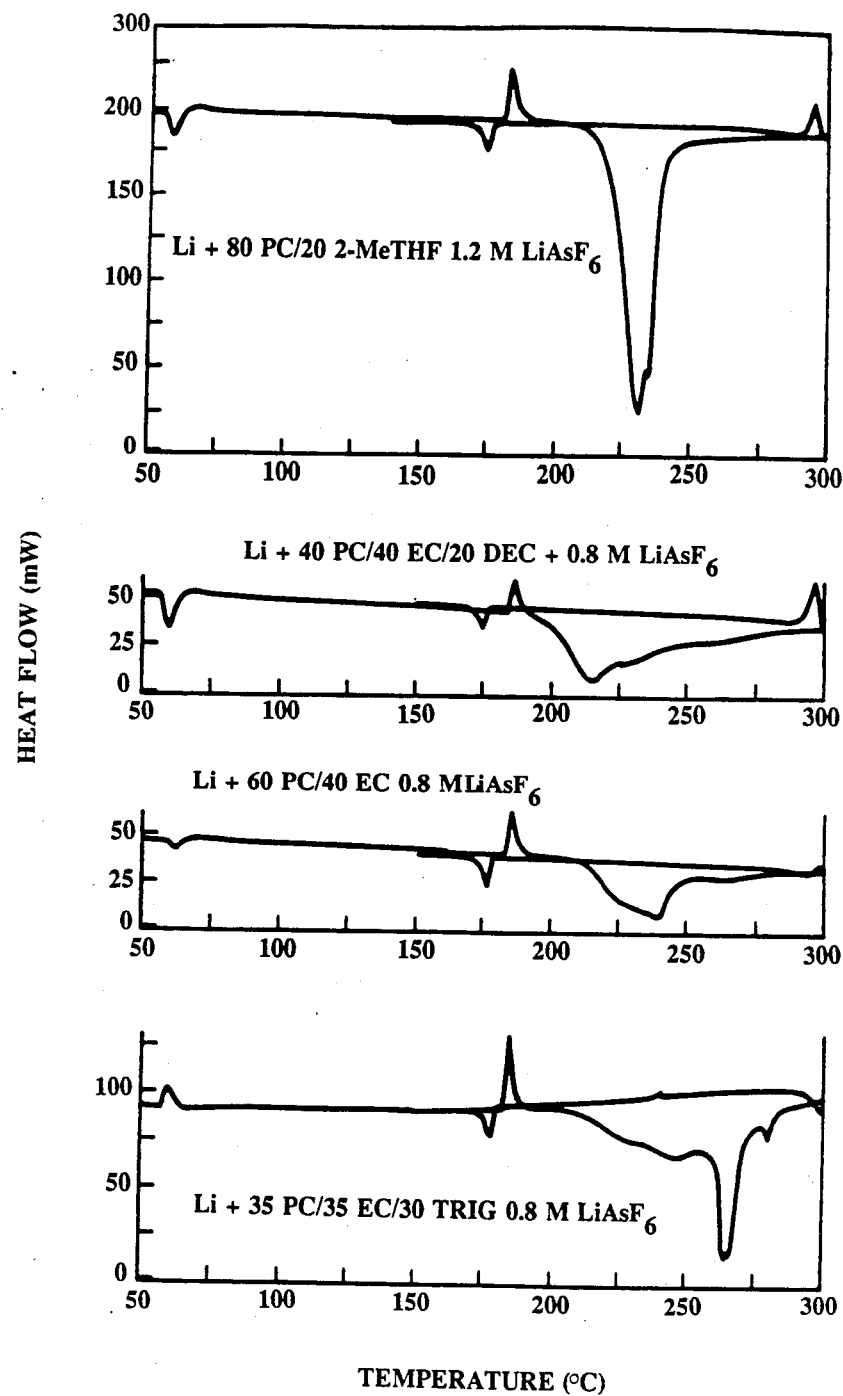
FIG. 4 shows several differential scanning calorimetry curves for samples containing lithium and various electrolyte compositions.

A comparison of the DSC curves for four electrolytes is shown in FIG. 4. The main feature for comparison is the temperature of the peak maxima. In this figure, the peak heights and areas are not normalized for the amount of reactants, which differed greatly, and thus, these values cannot be directly compared. Various mixed solvent electrolytes were measured and are shown in FIG. 4. The much higher temperature of the peak maximum for the 35PC/35EC/30Trig, 0.8M LiAsF$_6$ electrolyte is an indication that it should behave more safely under rapid heating abuse of an actual cell, than the other three electrolytes shown. This was verified by a rapid heating test on actual cells using heating rates in the range of 70° C. min$^{-1}$.

Table 1 lists some features of the reaction exotherm obtained from the DSC curves at 10° C. min$^{-1}$ for various electrolytes. The peak height and total heat are normalized by dividing the weight of lithium consumed in the reaction. The ratio of weight of lithium reacted to weight of electrolyte reacted is also given as an indication of the reactivity of the electrolyte with the lithium. These values for the electrolytes containing DEC and 2-MeTHF are less accurate because of the volatile nature of the solvents causing decreased accuracy in the weight and solvent ratio of these electrolytes. The electrolyte containing DEC had a further complication since it reacted with the lithium below its melting point. This results in an error in its heat output as normalized to the weight of lithium. Of all the parameters measured the temperature of the peak maximum has been determined to be the most reliable parameter for comparing the relative safety of the different electrolytes. In general, by comparison with cell heating tests, the higher this temperature is, the safer the electrolyte will be in actual cell abuse. The other parameters give useful information but must be considered cautiously and with respect to one another and the peak maximum temperature. The initiation temperature can be valuable for simpler systems such as single solvents, or predominantly one solvent mixture. It is less useful for complicated systems, with more equal solvent ratios and high concentrations of salt, which may show multiple exothermic peaks. The peak heights and total heats per gram of lithium are more difficult to use in comparing different systems. At a given heating rate both of these can be larger, for what may be a less reactive system, because the initiation and peak maximum temperatures are higher. This would cause the reactions to go faster and could involve more overlap of reactions within one apparent peak. Therefore, the initiation and peak maximum temperatures are considered to be qualitative weighting factors.

TABLE 1

| | SUMMARY OF DSC EXPERIMENTS AT 10° C. min$^{-1}$ | | | | |
|---|---|---|---|---|---|
| Electrolytes* | Init. Temp. (°C.) | Peak Heat (W$g_{Li}^{-1}$) | Peak Temp. (°C.) | Total Heat (KJ $g_{Li}^{-1}$) | Li Consumed ($g_{Li} g_{Sol}^{-1}$) |
| 35PC/35EC/30Trig | 259.00 | −140.00 | 263.00 | −19.40 | 0.27 |
| 40PC/40EC/20Trig | 257.00 | −100.00 | 272.20 | −25.20 | 0.20 |
| 70EC/30Trig | 269.00 | −47.00 | 272.20 | −14.60 | 0.21 |
| 70PC/30Trig | 231.00 | −110.00 | 241.10 | −22.00 | 0.22 |
| 100Trig | 195.00 | −102.00 | 205.70 | −15.00 | 0.32 |
| 35PC/35EC/30Tetrag | 265.00 | −142.00 | 270.50 | −20.30 | 0.19 |
| 40PC/40EC/20Tetrag | 259.00 | −218.00 | 269.10 | −22.10 | 0.20 |
| 50PC/40EC/10Tetrag | 260.00 | −140.00 | 264.20 | −22.10 | 0.24 |
| 100Tetrag | 154.00 | −75.00 | 183.00 | −14.60 | 0.32 |

TABLE 1-continued

| Electrolytes* | SUMMARY OF DSC EXPERIMENTS AT 10° C. min$^{-1}$ | | | | |
| --- | --- | --- | --- | --- | --- |
| | Init. Temp. (°C.) | Peak Heat (W$g_{Li}^{-1}$) | Peak Temp. (°C.) | Total Heat (KJ $g_{Li}^{-1}$) | Li Consumed ($g_{Li}$ $g_{Sol}^{-1}$) |
| 50PC/50EC | 208.00 | −108.50 | 221.00 | −19.50 | 0.31 |
| 60PC/40EC | 212.00 | −78.00 | 238.00 | −14.00 | 0.52 |
| 40PC/40EC/20DEC | 200.00 | −165.00 | 215.00 | −34.00 | 0.20 |
| 80PC/20MeTHF | 224.00 | −295.00 | 232.00 | −25.00 | 0.26 |

*All are 0.8 M LiAsF$_6$ except 80PC/20MeTHF which was 1.2 M.

What is claimed is:

1. A nonaqueous cell comprising lithium negative electrode, positive electrode comprising active material and electrolyte comprising solvent and current carrying species characterized in that the solvent comprises at least 15 mole percent ethylene carbonate, at least 15 mole percent propylene carbonate and at least 15 mole percent polyethylene glycol dialkyl ether.

2. The cell of claim 1 in which the solvent comprises at least 15 mole percent ethylene carbonate, at least 15 mole percent propylene carbonate and at least 25 mole percent polyethylene glycol dialkyl ether.

3. The cell of claim 2 in which the solvent comprises 25 to 40 mole percent ethylene carbonate, 25 to 40 mole percent propylene carbonate and 25 to 40 mole percent polyethylene glycol dialkyl ether.

4. The cell of claim 1 in which the polyethylene glycol dialkyl ether is polyethylene glycol dimethyl ether.

5. The cell of claim 4 in which the polyethylene glycol dimethyl ether is triglyme.

6. The cell of claim 4 in which the polyethylene glycol dimethyl ether is tetraglyme.

7. The cell of claim 1 in which the current carrying species comprises at least one lithium salt selected from the group consisting of LiPF$_6$, LiAsF$_6$, LiClO$_4$, LiCF$_3$SO$_3$, LiBF$_4$, LiAlCl$_4$, LiI, LiF and LiBr.

8. The cell of claim 7 in which the lithium salt is LiPF$_6$.

9. The cell of claim 7 in which the lithium salt is LiAsF$_6$.

10. The cell of claim 7 in which the concentration of lithium salt is between 0.05M and saturation.

11. The cell of claim 10 in which the concentration of lithium salt is between 0.25 and 0.75 of saturation.

12. The cell of claim 7 in which the current carrying species comprises lithium salt and tetraalkylammonium salt with up to six carbon atoms on the alkyl group.

13. The cell of claim 12 in which the current carrying species comprises lithium salt and one or more tetrabutylammonium salts with anion selected from the group consisting of chlorine, bromine, iodine, hexafluoroarsenate, hexafluorophosphate, tetrafluoroborate and perchlorate.

14. The cell of claim 12 in which the current carrying species comprises lithium salt and one or more tetraethylammonium salts with anion selected from the group consisting of chlorine, bromine, iodine, tetrafluoroborate, hexafluorophosphate, hexafluoroarsenate and perchlorate.

15. The cell of claim 12 in which the lithium salt has a concentration between 0.4 and 0.8 molar and tetraalkylammonium salt has a concentration between 0.2 and 0.4 molar.

16. The cell of claim 1 in which the solvent comprises in addition diethyl carbonate with concentration between 0 and 30 mole percent.

17. The cell of claim 16 in which the concentration of diethyl carbonate is 20 mole percent.

* * * * *